UNITED STATES PATENT OFFICE.

SHADRACH DIXON, OF SAN MARCOS, TEXAS.

IMPROVEMENT IN MEDICAL COMPOUNDS.

Specification forming part of Letters Patent No. 152,979, dated July 14, 1874; application filed June 6, 1874.

*To all whom it may concern:*

Be it known that I, SHADRACH DIXON, of San Marcos, Hays county, Texas, have invented a new and useful Improvement in Medical Compound, of which the following is a specification:

This invention and discovery relates to the curative art; and consists of a composition formed of the ingredients hereinafter named, in about the proportions specified.

In carrying out my invention I proceed in the following manner: To one gallon of alcohol I add three ounces of asafetida, one quart tincture of camphor, one ounce of laudanum, one ounce of tincture of yellow jessamine, one-half ounce oil of sassafras, and one and a half gallon of soft water. Good brandy may be used instead of alcohol, in which case I add one gallon of water.

These ingredients are to be well mixed, when the composition is ready for use.

The combination of these ingredients forms a medicine which is a sovereign cure for cholera, cholera morbus, and kindred complaints, such as diarrhea, flux, &c.

Having thus described my invention, I claim as new and desire to secure by Letters Patent—

The above-described compound, substantially as and for the purposes specified.

SHADRACH DIXON.

Witnesses:
   F. M. HALL,
   J. M. SMITH.